(12) United States Patent
Sanghvi et al.

(10) Patent No.: US 10,380,746 B2
(45) Date of Patent: Aug. 13, 2019

(54) SPARSE OPTICAL FLOW SUPPORT IN AN OPTICAL FLOW SYSTEM

(71) Applicant: TEXAS INSTRUMENTS INCORPORATED, Dallas, TX (US)

(72) Inventors: Hetul Sanghvi, Richardson, TX (US); Mihir Narendra Mody, Bengaluru (IN); Mike Lachmayr, Boxford, MA (US); Anish Reghunath, Plano, TX (US); Rajat Sagar, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 109 days.

(21) Appl. No.: 15/784,285

(22) Filed: Oct. 16, 2017

(65) Prior Publication Data

US 2019/0114786 A1    Apr. 18, 2019

(51) Int. Cl.
*G06T 7/246* (2017.01)
*G06T 7/223* (2017.01)

(52) U.S. Cl.
CPC .............. *G06T 7/223* (2017.01); *G06T 7/248* (2017.01)

(58) Field of Classification Search
None
See application file for complete search history.

(56) References Cited

U.S. PATENT DOCUMENTS

| | | | | |
|---|---|---|---|---|
| 9,786,062 | B2* | 10/2017 | Sorkine-Hornung | G06T 7/557 |
| 10,074,151 | B2* | 9/2018 | Eldar | G06T 1/0007 |
| 2015/0131728 | A1* | 5/2015 | Wang | H04N 19/56 375/240.16 |
| 2016/0010138 | A1* | 1/2016 | Shamsheyeva | C12Q 1/18 702/19 |
| 2017/0148223 | A1* | 5/2017 | Holzer | G06T 3/4038 |
| 2017/0244960 | A1* | 8/2017 | Ciurea | G06T 5/006 |

OTHER PUBLICATIONS

Sparse Occlusion Detection with Optical Flow Alper Ayvaci • Michalis Raptis • Stefano Soatto Received: Jul. 12, 2010 / Accepted: Aug. 5, 2011 © Springer Science+Business Media, LLC 2011.*

* cited by examiner

*Primary Examiner* — Nancy Bitar
(74) *Attorney, Agent, or Firm* — Ebby Abraham; Charles A. Brill; Frank D. Cimino

(57) ABSTRACT

An optical flow system includes a binary mask generation circuit and an optical flow circuit. The binary mask generation circuit is configured to receive a plurality of points of interest from a captured image that contains an array of pixels arranged as rows and columns and includes width lines that correspond to the rows and height lines that correspond to the columns. The binary mask generation circuit is also configured to generate a binary mask based on the plurality of points of interest. The binary mask includes a representation of a subset of the plurality of points of interest. The optical flow circuit is configured to receive the binary mask and generate an optical flow map of the subset of the plurality of points of interest.

20 Claims, 4 Drawing Sheets

US 10,380,746 B2

SPARSE OPTICAL FLOW SUPPORT IN AN OPTICAL FLOW SYSTEM

BACKGROUND

Optical flow systems generate optical flow maps that show the relative motion of objects in a field of view (FOV) of a camera based on the change in each of a number of pixels from one frame of a captured image to the next frame. For example, a motion vector value is assigned to each of the pixels corresponding to the relative motion for that pixel. Additionally, a confidence measure may be generated for each of the motion vectors. These systems may be used in many applications including: object tracking, moving object segmentation (e.g., segmenting moving objects from still objects), and structure from motion (e.g., generating a three dimensional (3D) model of structure by taking moving images of the structure). For example, in transportation, automobiles may include optical flow systems to track moving objects within the FOV. The automobile may utilize the object tracking to, for example, determine whether a collision between the automobile and the other object, such as another vehicle, is possible, and automatically apply braking.

SUMMARY

In accordance with at least one embodiment of the disclosure, an optical flow system includes a binary mask generation circuit and an optical flow circuit. The binary mask generation circuit is configured to receive a plurality of points of interest from a captured image that contains an array of pixels arranged as rows and columns and includes width lines that correspond to the rows and height lines that correspond to the columns. The binary mask generation circuit is also configured to generate a binary mask based on the plurality of points of interest. The binary mask includes a representation of a subset of the plurality of points of interest. The optical flow circuit is configured to receive the binary mask and generate an optical flow map of the subset of the plurality of points of interest.

Another illustrative embodiment is a binary mask generation circuit that includes a mask receiving circuit and a mask build circuit. The mask receiving circuit is configured to receive a plurality of points of interest from a captured image that contains an array of pixels arranged as rows and columns and including width lines that correspond to the rows and height lines that correspond to the columns. The mask build circuit is configured to generate a binary mask based on the plurality of points of interest. The binary mask includes a representation of a subset of the plurality of points of interest.

Yet another illustrative embodiment is a method for providing sparse optical flow support in an optical flow system. The method includes receiving a plurality of points of interest from a captured image containing an array of pixels arranged as rows and columns and including width lines that correspond to the rows and height lines that correspond to the columns. The method also includes generating a binary mask based on the plurality of points of interest. The binary mask includes a representation of a subset of the plurality of points of interest. The method also includes generating an optical flow map of the subset of the plurality of points of interest.

BRIEF DESCRIPTION OF THE DRAWINGS

For a detailed description of various examples, reference will now be made to the accompanying drawings in which.

NOTATION AND NOMENCLATURE

Figure 1:
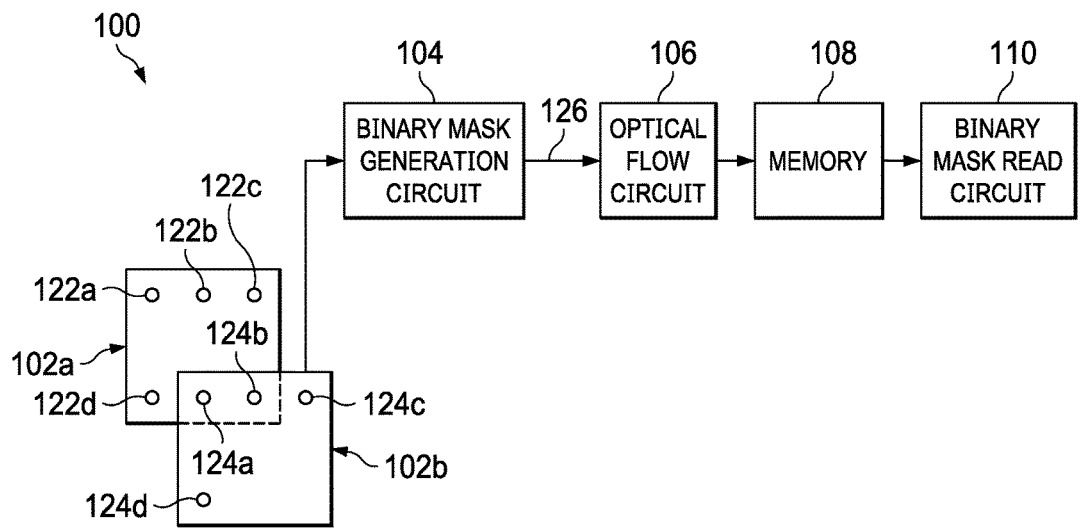
FIG. 1 shows an illustrative optical flow system in accordance with various examples.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Optical flow systems generate optical flow maps that show the relative motion of objects in a field of view (FOV) of a camera (e.g., a 3D time of flight (TOF) camera) based on the change in each of a number of pixels from one frame of a captured image to the next frame. These systems may be used in many applications including: object tracking, moving object segmentation (e.g., segmenting moving objects from still objects), and structure from motion (e.g., generating a three dimensional (3D) model of structure by taking moving images of the structure). For example, in transportation, automobiles may include optical flow systems to track moving objects within the FOV. The automobile may utilize the object tracking to, for example, determine whether a collision between the automobile and the other object, such as another vehicle, is possible, and automatically apply braking.

In general, there are two types of optical flow. Dense optical flow (DOF) determines a motion vector for every pixel in a captured image. Sparse optical flow (SOF) defines one or more points of interest in a captured image and motion vectors are generated for only the pixels that correspond with the points of interest. The points of interest can be arbitrary or picked based on any criteria (e.g., using an interest point detector). For example, optical flow may be generated for only 1000 pixels that correspond to points of interest in a 2 megapixel image. Optical flow is not generated for the remaining pixels that correspond to the points that are not of interest. Thus, by utilizing sparse optical flow, processing requirements are reduced, yet the optical flow of every point of interest is determined.

Currently, it is difficult to implement SOF in hardware. Therefore, conventional optical flow systems perform DOF in hardware and write the entire dense optical flow into external memory (e.g., double data rate synchronous dynamic random-access memory (DDR)). In the conventional system, a processor then reads selectively. In other words, the conventional system utilizes a processor to read only optical flow for the points of interest. Thus, the conventional system writes DOF to the external memory and reads SOF from the memory. However, because the hardware writes DOF into the external memory, excessive memory bandwidth and power is consumed. For example, a DOF write to memory consumes 480 megabytes per second of memory for a 2 megapixel image operating with a frame rate of 30 frames per second. Therefore, there is a need for providing SOF support for the hardware in the optical flow system so that the hardware generates a sparse write (e.g., only optical flow for the points of interest), a semi-dense write (e.g., DOF for a region of interest within the captured image), and/or a pseudo-sparse write (e.g., DOF for a sub-region of interest within the captured image) to the external memory which then can be read by the processor.

In accordance with various examples, an optical flow system is provided with a binary mask generation circuit that generates a constrained binary mask on the captured image. The binary mask defines constraints on the captured image so that a data pattern is defined which allows a sparse write to external memory. For example, the binary mask generation circuit receives the captured image along with the points of interest (e.g., generated by a conventional interest point detector). The binary mask generation circuit then may generate the binary mask to include only a subset of all the pixels in the captured image, and in some embodiments, a subset of the points of interest. This data pattern in the binary mask is provided to an optical flow circuit (e.g., a hardware accelerator). The optical flow circuit then utilizes the binary mask to generate an optical flow map of the subset of pixels/subset of points of interest which is written into the external memory (e.g., DDR). In this way, a sparse write, semi-dense write, and/or pseudo-sparse write is provided to the external memory, thus, reducing memory bandwidth and power needs.

FIG. 1 shows an illustrative optical flow system 100 in accordance with various examples. The optical flow system 100 includes, in an embodiment, a binary mask generation circuit 104, an optical flow circuit 106, a memory 108, and a binary mask read circuit 110. The binary mask generation circuit 104 is configured to receive a plurality of points of interest from one or more captured images 102a-b. The images 102a-b are, in some embodiments, captured by a camera (e.g., a 3D TOF camera) from a FOV at different times. For example, image 102a is an image of the FOV taken at time t while image 102b is an image of the FOV taken at time t+Δt. Each of the images 102a-b include one or more points of interest which may be determined by an interest point detector, or in some embodiments, set arbitrarily. For example, image 102a includes points of interest 122a-d, and image 102b includes points of interest 124a-d. Each point of interest 122a-d and 124a-d corresponds with a pixel in the image 102a and 102b respectively. Additionally, in an embodiment, the points of interest 122a-d correspond with the points of interest 124a-d. For example, the images 102a-b include an array of pixels that can be arranged as rows and columns. One pixel in image 102a corresponds with point of interest 122a at time t. One pixel in image 102b corresponds with point of interest 124a, which is the same point of interest as point of interest 122a at time t+Δt. Similarly, one or more pixels in the array of pixels that comprises image 102a corresponds with points of interest 122b-d, and one or more pixels in the array of pixels that comprises image 102b corresponds with points of interest 124b-d. Thus, the binary mask generation circuit 104 is configured to receive points of interest 122a-d and 124a-d.

The binary mask generation circuit 104 is also configured to generate a binary mask 126 based on the received points of interest. Therefore, the binary mask 126 generated by the binary mask generation circuit 104 is based on 122a-d and/or 124a-d. In some embodiments, the binary mask 126 is based on a subset (i.e., less than the entire set) of the pixels in the array of pixels that make up images 102a and/or 102b. Furthermore, in some embodiments, the binary mask 126 is based on a subset (i.e., less than the entire set) of the points of interest 122a-d and/or 124a-d. Thus, the generated binary mask 126 can include less than all of the pixels that form the array of pixels comprising the images 102a and/or 102b, and in some embodiments, less than all of the points of interest 122a-d and/or 124a-d.

The optical flow circuit 106 is, in an embodiment, hardware (e.g., a hardware accelerator) configured to receive the binary mask 126 from the binary mask generation circuit 104 and generate an optical flow map of the subset of pixels contained in the mask. For example, if the binary mask 126 includes only points of interest 124a-c, then the optical flow circuit 106 is configured to generate an optical flow of only the pixels corresponding to the points of interest 124a-c and not 124d. Thus, the optical flow circuit 106 can provide SOF. The optical flow map provides a motion vector for each of the pixels/points of interest provided by the binary mask 126.

The memory 108 is configured to store the generated optical flow map. In some embodiments, memory 108 is DDR. However, memory 108 can be any type of memory including any type of random access memory (RAM) (e.g., dynamic RAN (DRAM) and/or static RAM (SRAM)), read-only memory (ROM) (e.g., mask ROM, programmable ROM (PROM), erasable PROM (EPROM), and/or electrically erasable PROM (EEPROM)), non-volatile RAM (NVRAM) (e.g., flash memory and/or solid-state storage), magnetic memory (e.g., magnetic tape, hard disk, and/or optical disk), etc.

The binary mask read circuit 110 is configured to read the optical flow map stored in the memory 108 (e.g., a sparse flow optical map) and perform additional processing (e.g., apply braking based on the optical flow map). The binary mask read circuit 110 can be a digital signal processor (DSP), a central processing unit (CPU), a reduced instruction set computing (RISC) core such as an advanced RISC machine (ARM) core, a mixed signal processor (MSP), field programmable gate array (FPGA), etc. In this way, the optical flow system 100 can provide SOF through a SOF write to the memory 108 and a SOF read from the memory 108, thus, reducing memory 108 bandwidth and power needs.

Figure 2:
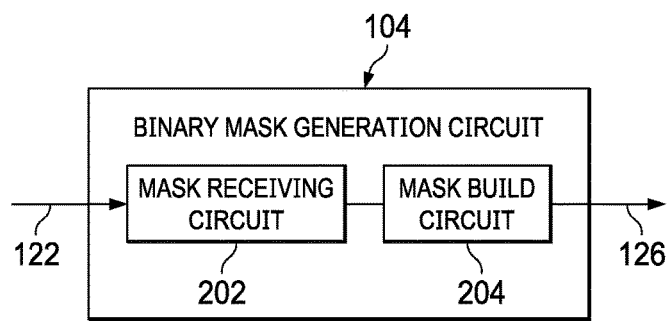
FIG. 2 shows an illustrative binary mask generation circuit of an optical flow system in accordance with various examples.

FIG. 2 shows an illustrative binary mask generation circuit 104 of optical flow system 100 in accordance with various examples. The binary mask generation circuit 104 includes, in an embodiment, mask receiving circuit 202 and mask build circuit 204. The mask receiving circuit 202 is configured to receive the plurality of points of interest, as discussed above, from a captured image, such as captured images 102*a-b*. For example, the points of interest 122*a-d* can be received from captured image 102*a-b*. The mask build circuit 204 is configured to generate the binary mask 126 as discussed above. Thus, as discussed above, the binary mask generation circuit 104 receives points of interest corresponding to pixels through the mask receiving circuit 202 and generate the binary mask 126 through the mask build circuit 204.

Figure 3:
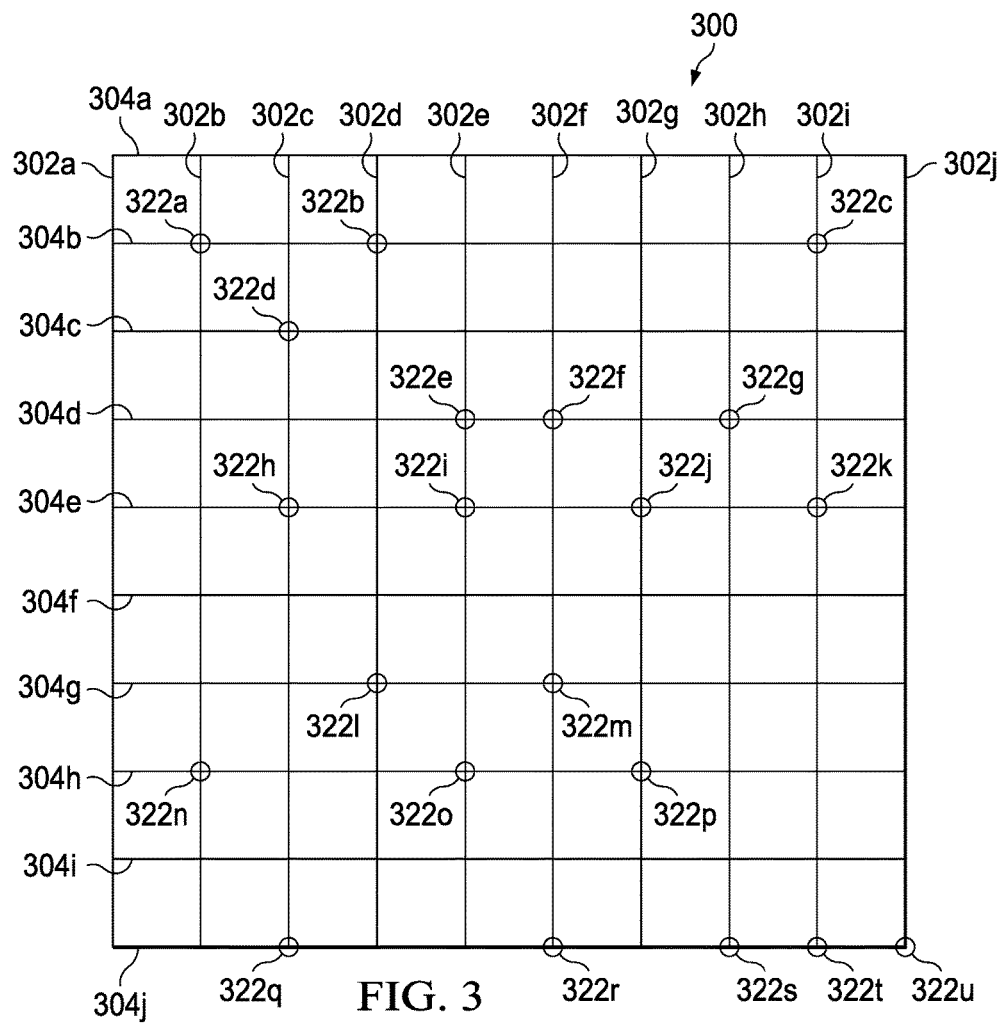
FIG. 3 shows an illustrative captured image with points of interest at the intersection of various width lines and height lines for an optical flow system in accordance with various examples.

FIG. 3 shows an illustrative captured image 300 with points of interest 322*a-u* at the intersection of various width lines 304*a-j* and height lines 302*a-j* for optical flow system 100 in accordance with various examples. As discussed above, the captured image 300 includes an array of pixels arranged as rows and columns. The height lines 302 correspond to the columns and the width lines 304 correspond to the rows. Thus, the intersection of each height line 302 and each width line 304 is the location of a pixel.

As discussed above, the binary mask generation circuit 104, through the mask build circuit 204, is configured to generate the binary mask 126 based on the plurality of points of interest 322 received. In an embodiment, the mask build circuit 204 is configured to determine an active line size for each of the width lines 304. The active line size corresponds with the number of points of interest on a particular width line. Thus, in the example shown in FIG. 3, the width line 304*a* has an active line size of 0; the width line 304*b* has an active line size of 3 (points of interest 322*a-c*); the width line 304*c* has an active line size of 1 (point of interest 322*d*); the width line 304*d* has an active line size of 3 (points of interest 322*e-g*); the width line 304*e* has an active line size of 4 (points of interest 322*h-k*); the width line 304*f* has an active line size of 0; the width line 304*g* has an active line size of 2 (points of interest 322*l-m*); the width line 304*h* has an active line size of 3 (points of interest 322*n-p*); the width line 304*i* has an active line size of 0; and the width line 304*j* has an active line size of 5 (points of interest 322*q-u*).

The mask build circuit 204 can, in an embodiment, compare the active line size of each of the width lines to a line size threshold value which is programmed into the mask build circuit 204. If a width line has an active line size less than the line size threshold, the mask build circuit 204 removes the width line including the corresponding points of interest. For example, if the line size threshold is 2, then width lines 304*a*, 304*c* (including the point of interest 322*d*), 304*f*, and 304*i* are removed from the binary mask 126 because they have active line sizes less than the line size threshold. The remaining width lines remain in the binary mask 126. In this way, the binary mask 126 is pruned of width lines. Thus, optical flow of less than all of the pixels in the captured image is performed saving bandwidth and power consumption.

The mask build circuit 204 also, in an embodiment, is configured to determine an active line width for each of the width lines that have an active line size greater than 0. The active line width is the line length between a first point of interest on a width line (e.g., the point of interest corresponding to the leftmost pixel on the width line) and the last point of interest on the width line (e.g., the point of interest corresponding to the rightmost pixel on the width line). For example, the first point of interest on width line 304*b* is point of interest 322*a* and the last point of interest on width line 304*b* is point of interest 322*c*. The line length between points of interest 322*a* and 322*c*, and thus, the active line width is 7 because there are 7 height lines (and thus, pixels) between points of interest 322*a* and 322*c*. Similarly, for width line 304*d*, the active line width is 3 because there are 3 pixels between first point of interest 322*e* and last point of interest 322*g*. Because there is only 1 point of interest on width line 304*c*, point of interest 322*d*, the active line width for width line 304*c* is 0.

Figure 4:
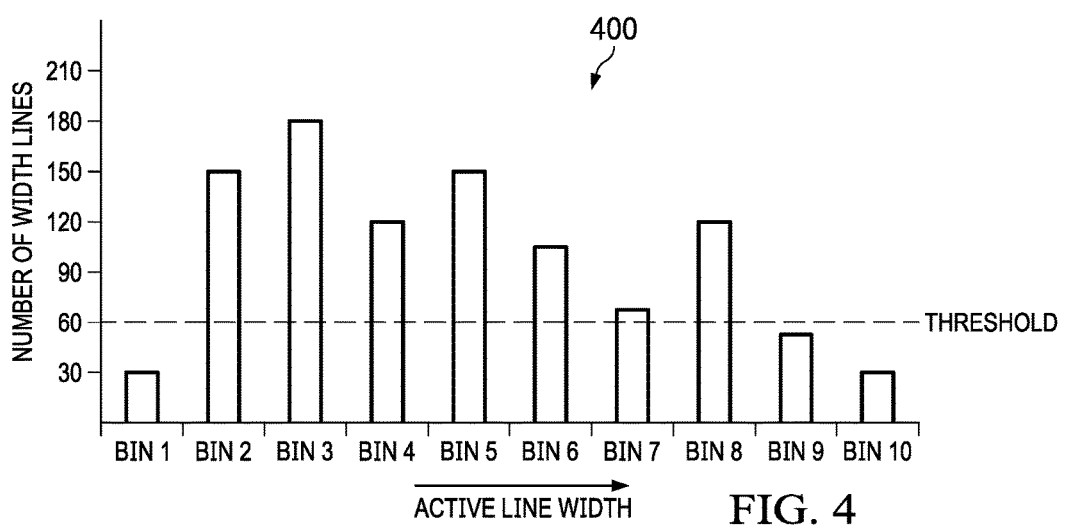
FIG. 4 shows an illustrative histogram of bins containing width lines where the width lines are binned based on the active line width of the width line in accordance with various examples.

FIG. 4 shows an illustrative histogram of bins 400 containing width lines where the width lines are binned based on the active line width of the width line in accordance with various examples. As discussed above, the mask build circuit 204 is configured to determine, in an embodiment, an active line width for each of the width lines of the image. Additionally, the mask build circuit 204, in an embodiment, is further configured to generate bins based on the active line width of each width line. In the example shown in FIG. 4, 10 bins (Bins 1-10) are generated by the mask build circuit 204. Each of the width lines is grouped by active line width into a bin.

For example, if the image is 1 megapixel, the array of pixels can be 1000 pixels by 1000 pixels, and the active line width for each width line can be as short as 0 and as long as 999. If the histogram 400 is divided into 10 bins (any number of bins may be used), then Bin 1 would contain width lines that have an active line width between 0 and 99; Bin 2 would contain width lines that have an active line width between 100 and 199; Bin 3 would contain width lines that have an active line width between 200 and 299; Bin 4 would contain width lines that have an active line width between 300 and 399; Bin 5 would contain width lines that have an active line width between 400 and 499; Bin 6 would contain width lines that have an active line width between 500 and 599; Bin 7 would contain width lines that have an active line width between 600 and 699; Bin 8 would contain width lines that have an active line width between 700 and 799; Bin 9 would contain width lines that have an active line width between 800 and 899; and Bin 10 would contain width lines that have an active line width between 900 and 999. In the example histogram 400, there are 30 width lines that have an active line width between 0 and 99 and thus, are grouped in Bin 1. Similarly, there 150 width lines that are have an active line width between 100 and 199 and thus, are grouped in Bin 2. The remaining bins are similarly grouped by active line width. Hence, the mask build circuit 204 is configured, in an embodiment, to determine the number of width lines in each bin.

The mask build circuit 204 can also remove one or more bins from the binary mask 126. In other words, if a bin is removed, the width lines that are included in the removed bin are not included in the binary mask 126. For example, assuming Bin 10 is removed from the binary mask 126, then the width lines that are included in Bin 10 are removed from the binary mask 126. Thus, if Bin 10 includes width lines 304*b* and 304*j* from FIG. 3, then width lines 304*b*, including the points of interest 322*a-c*, and 304*j*, including the points of interest 322*q-u*, are removed from the binary mask 126.

In some embodiments, the bin that includes width lines with the longest mean active line width is removed. For example, as shown in FIG. 4, the bins are arranged from the shortest mean active line width on the left to the longest mean active line width on the right. In other words, Bin 1 contains the width lines with the shortest mean active line width (e.g., 0-99) and Bin 10 contains the width lines with the longest mean active line width (e.g., 900-999). Thus, in an embodiment, Bin 10 would be removed first, then Bin 9 and so on depending on the desired number of points of interest (e.g., bandwidth savings for the memory 108) in which to perform optical flow. This desired number of points of interest in which to perform optical flow can be programmed into the mask build circuit 204. Therefore, in an embodiment, a bin removal threshold value corresponding to the number of width lines in a bin (e.g., 60 width lines in FIG. 4) can be programmed into the mask build circuit 204. The mask build circuit 204 can compare the number of width lines in the bin that includes the width lines with the longest mean active line width (e.g., Bin 10) to the bin removal threshold value. If the number of width lines in the bin is less than the bin removal threshold value, the bin is removed. The number of width lines in the bin that includes the width lines with the next longest mean active line width (e.g., Bin 9) is then compared, by the mask build circuit 204, to the bin removal threshold value and removed from the binary mask 126 if the number of width lines in the bin is less than the bin removal threshold value. This process continues until the number of width lines in a bin is greater than and/or equal to the bin removal threshold value. Once the number of width lines in a bin is greater than and/or equal to the bin removal threshold value, the bin remains in the binary mask 126 and each of the remaining width lines and corresponding points of interest in the remaining bins remain in the binary mask 126. In other words, the last "L" consecutive bins in the histogram (the bins containing the longest mean active line widths) are removed from the binary mask 126 if those bins contain a number of width lines that is less than the bin removal threshold value. In this way, because the width lines with the longest active line widths are removed from the binary mask 126, the width of the binary mask 126 is pruned. Therefore, optical flow of less than all of the pixels in the captured image is performed saving bandwidth and power consumption.

Figure 5:
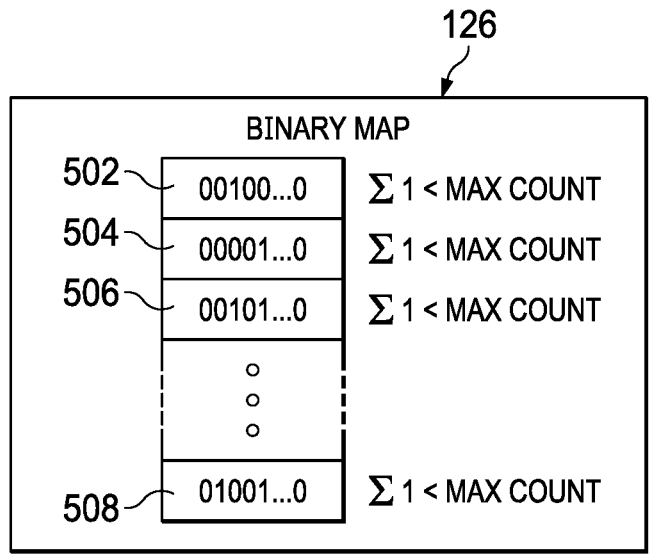
FIG. 5 shows an illustrative binary mask generated by a binary mask generation circuit of an optical flow system in accordance with various examples.

FIG. 5 shows an illustrative binary mask 126 generated by binary mask generation circuit 104 of optical flow system 100 in accordance with various examples. The binary mask 126 includes a binary map that comprises a bit position corresponding to each pixel in the pixel array in the captured image 102*a*, 102*b*, and/or 300. Each bit position, in an embodiment, is represented by a single bit in which a 1 indicates a point of interest is located at the bit position and a 0 indicates a point of interest is not located at the bit position. For example, the block 502 corresponds with width line 304*c* where the first two pixels on the width line do not have a point of interest and are thus, represented by a 0, but the third pixel includes point of interest 322*d* and is thus, represented by a 1. Similarly, block 504 corresponds with width line 304*d*; block 506 corresponds with width line 304*e*; and block 508 corresponds with width line 304*j*. As discussed above, some width lines are removed from binary mask 126, and thus are not represented in the binary map.

Additionally, each block 502-508 cannot have more 1s than a programmable MAXCOUNT value. Thus, the binary mask 126 is able to be further pruned by setting a lower MAXCOUNT value. If a block 502-508 does have more 1s than the MAXCOUNT value, then one or more of the 1s are pruned from the block to reduce the number of pixels that are provided to optical flow circuit 106 for optical flow.

Figure 6:
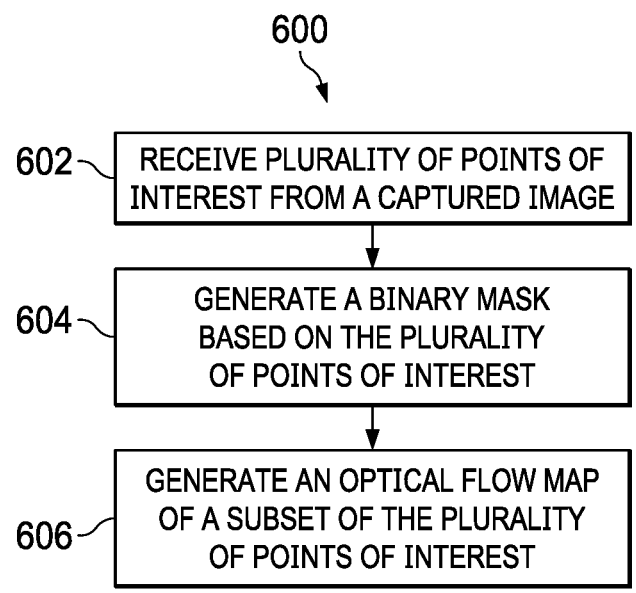
FIG. 6 shows an illustrative flow diagram of a method for providing sparse optical flow support in an optical flow system in accordance with various examples.

FIG. 6 shows an illustrative flow diagram of a method 600 for providing SOF support in an optical flow system in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, are performed by the binary mask generation circuit 104 (including the mask receiving circuit 202 and/or the mask build circuit 204), the optical flow circuit 106, the memory 108, and/or the binary mask read circuit 110 and implemented in logic and/or by a processor executing instructions stored in a non-transitory computer readable storage medium.

The method 600 begins in block 602 with receiving a plurality of points of interest from a captured image. For example, the points of interest 122*a-d* from captured image 102*a*, points of interest 124*a-d* from captured image 102*b*, and/or points of interest 322*a-u* from captured image 300 can be received by the mask receiving circuit 202 of the binary mask generation circuit 104.

In block 604, the method 600 continues with generating a binary mask based on the plurality of points of interest. For example, the mask build circuit 204 of the mask generation circuit 104 can be configured to generate the binary mask 126 based on points of interest 122*a-d*, 124*a-d*, and/or 322*a-u*. In some embodiments, the binary mask 126 is based on a subset (i.e., less than the entire set) of the pixels in the array of pixels that make up images 102*a* and/or 102*b*. Furthermore, in some embodiments, the binary mask 126 is based on a subset (i.e., less than the entire set) of the points of interest 122*a-d*, 124*a-d*, and/or 322*a-u*.

The method 600 continues in block 606 with generating an optical flow map of a subset of the plurality of points of interest. For example, the optical flow circuit 106 can be configured to receive the binary mask 126 from the binary mask generation circuit 104 and generate an optical flow map of the subset of pixels contained in the mask. Hence, if the binary mask 126 includes only points of interest 124*a-c*, then the optical flow circuit 106 is configured to generate an optical flow of only the pixels corresponding to the points of interest 124*a-c* and not 124*d*.

Figure 7:
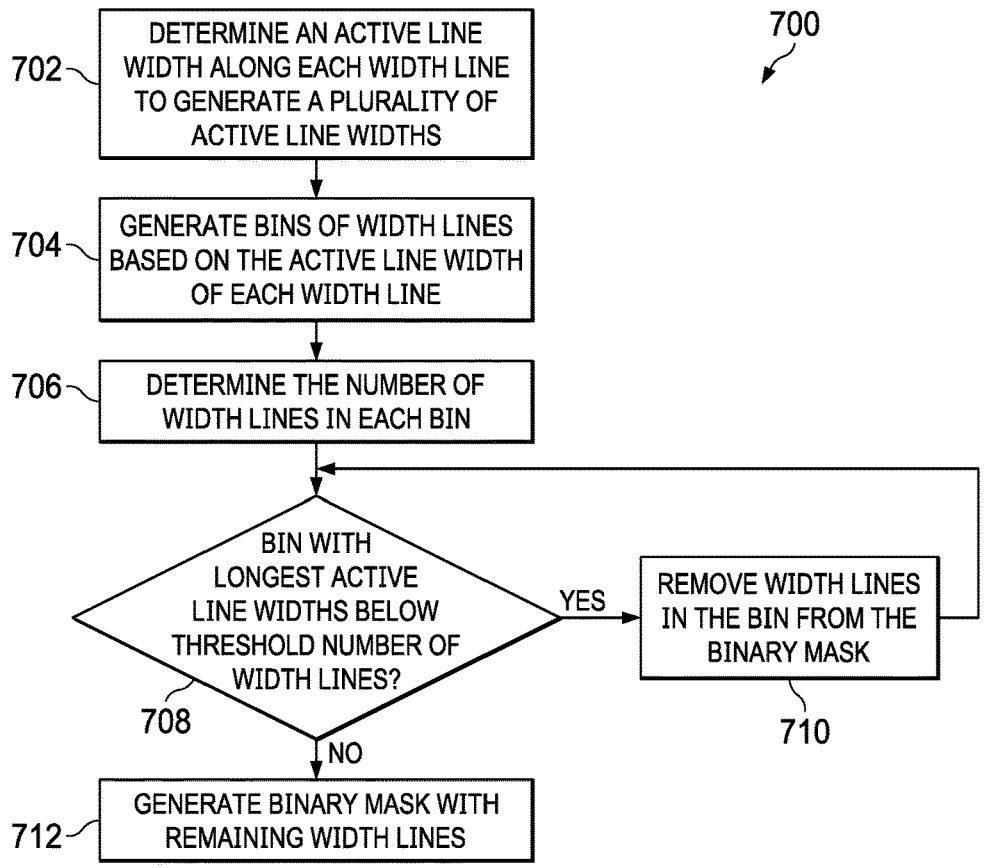
FIG. 7 shows an illustrative flow diagram of a method for generating a binary bit mask in an optical flow system in accordance with various examples.

FIG. 7 shows an illustrative flow diagram of a method 700 for generating a binary bit mask in an optical flow system in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 700, as well as other operations described herein, are performed by the mask build circuit 204 of the binary mask generation circuit 104 and implemented in logic and/or by a processor executing instructions stored in a non-transitory computer readable storage medium.

The method 700 begins in block 702 with determining an active line width along each width line to generate a plurality of active line widths. For example, the mask build circuit 204 can be configured to receive each width line and determine the line length between a first point of interest on each width line (e.g., the point of interest corresponding to the leftmost pixel on the width line) and the last point of interest on the width line (e.g., the point of interest corresponding to the rightmost pixel on the width line) to determine the active line width of each width line.

In block 704, the method 700 continues with generating bins of width lines based on the active line width of each width line. For example, each width line can be placed, by the mask build circuit 204, into a bin, such as Bins 1-10 in FIG. 4, based on how long is each of the width line's active line width. In other words, similar length width lines are placed in the same bin as each other.

The method 700 continues in block 706 with determining the number of width lines in each bin. For example, the mask build circuit 204 can determine the number of width lines in each of Bins 1-10. In block 708, the method 700 continues with a determination of whether the number of width lines in the bin with the longest active width lines (e.g., the longest median active width line) is below a threshold value. For example, if Bin 10 has the longest median active width line, the number of width lines in Bin 10 is compared to a bin removal threshold value.

If, in block 708, a determination is made that the number of width lines in the bin with the longest active width lines is below the threshold value, the method 700 continues in block 710 with removing the width lines in the bin with the longest active width lines from the binary mask. Continuing the previous example, if the number of width lines in Bin 10 is less than the bin removal threshold value, then Bin 10, and all of its width lines are removed from the binary mask 126. The method 700 continues in block 708 with determining whether the bin with the next longest active line widths (because the bin with the longest active line widths has been removed) has a number of width lines below the threshold value. Thus, continuing the previous example, the number of width lines in Bin 9 is compared to the bin removal threshold value.

If, in block 708, a determination is made that the number of width lines in the bin with the longest active width lines is greater than and/or equal to the threshold value, the method 700 continues in block 712 with generating the binary mask with the remaining width lines from the remaining bins.

Figure 8:
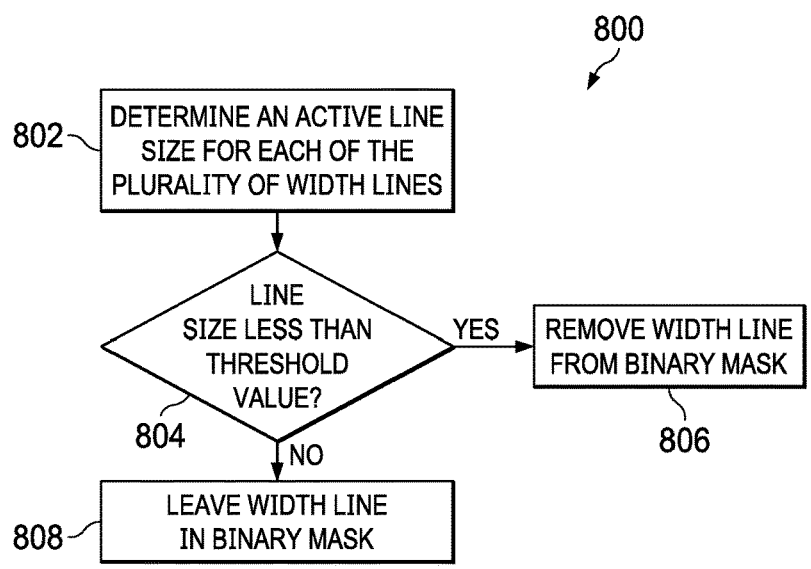
FIG. 8 shows an illustrative flow diagram of a method for generating a binary bit mask in an optical flow system in accordance with various examples.

FIG. 8 shows an illustrative flow diagram of a method 800 for generating a binary bit mask in an optical flow system in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 800, as well as other operations described herein, are performed by the mask build circuit 204 of the binary mask generation circuit 104 and implemented in logic and/or by a processor executing instructions stored in a non-transitory computer readable storage medium.

The method 800 begins in block 802 with determining an active line size for each of a plurality of width lines. For example, the mask build circuit 204 can be configured to determine the number of points of interest on each width line from a captured image. In block 804, the method 800 continues with determining whether the active line size of each of the width lines is less than a threshold value. For example, the mask build circuit 204 can be configured to determine whether the active line size of each width line is less than a line size threshold value.

If, in block 804, a determination is made that the line size of any width line is less than the threshold value, the method 800 continues in block 806 with removing the width lines that have a line size that is less than the threshold value from the binary mask. However, if, in block 804, a determination is made that the line size of any width line is greater than and/or equal to the threshold value, the method 800 continues in block 808 with leaving the width lines that have a line size that is greater than and/or equal to the threshold value in the binary mask.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. An optical flow system, comprising:
   a binary mask generation circuit configured to:
      receive a plurality of points of interest from a captured image containing an array of pixels arranged as rows and columns and including width lines that correspond to the rows and height lines that correspond to the columns; and
      generate a binary mask based on the plurality of points of interest, the binary mask including a representation of a subset of the plurality of points of interest;
   an optical flow circuit configured to receive the binary mask and generate an optical flow map of the subset of the plurality of points of interest.

2. The optical flow system of claim 1, wherein the binary mask generation circuit is further configured to:
   determine an active line width along each of the width lines to generate a plurality of active line widths;
   generate a plurality of bins based on the active line width of each width line;
   determine a number of width lines in each bin; and
   remove a first bin of the plurality of bins from the binary mask.

3. The optical flow system of claim 2, wherein the active line length for a first width line is a line length between a first point of the plurality of points of interest on the first width line and a last point of the of the plurality of points of interest on the first width line, the first point corresponding with a leftmost pixel containing the point of interest on the first width line and the last point corresponding with a rightmost pixel containing the point of interest on the first width line.

4. The optical flow system of claim 2, wherein the removed first bin contains the width lines with a longest mean active line width.

5. The optical flow system of claim 4, wherein the binary mask generation circuit is further configured to:
   compare a number of width lines in a second bin to a threshold value, the second bin containing a next longest mean active line width after the first bin; and
   in response to the number of width lines in the second bin being less than the threshold value, removing the width lines in the second bin from the binary mask.

6. The optical flow system of claim 1, wherein binary mask generation circuit is further configured to:
   determine an active line size for each of the plurality of width lines;
   remove the width lines in which the active line size is less than a threshold value from the binary mask.

7. The optical flow system of claim 1, wherein:
the binary mask includes a bit position corresponding to each pixel in the pixel array;
each position is represented by a single bit in which a 1 indicates a point of interest is located at the bit position and a 0 indicates a point of interest is not located at the bit position.

8. A binary mask generation circuit, comprising:
a mask receiving circuit configured to receive a plurality of points of interest from a captured image containing an array of pixels arranged as rows and columns and including width lines that correspond to the rows and height lines that correspond to the columns; and
a mask build circuit configured to generate a binary mask based on the plurality of points of interest, the binary mask including a representation of a subset of the plurality of points of interest.

9. The binary mask generation circuit of claim 8, wherein the mask build circuit is further configured to:
determine an active line width along each of the width lines to generate a plurality of active line widths;
generate a plurality of bins based on the active line width of each width line;
determine a number of width lines in each bin; and
remove a first bin of the plurality of bins from the binary mask.

10. The binary mask generation circuit of claim 9, wherein the active line length for a first width line is a line length between a first point of the plurality of points of interest on the first width line and a last point of the of the plurality of points of interest on the first width line, the first point corresponding with a leftmost pixel containing the point of interest on the first width line and the last point corresponding with a rightmost pixel containing the point of interest on the first width line.

11. The binary mask generation circuit of claim 9, wherein the removed first bin contains the width lines with a longest mean active line width of all the plurality of bins.

12. The binary mask generation circuit of claim 11, wherein the mask build circuit is further configured to:
compare a number of width lines in a second bin to a threshold value, the second bin containing a next longest mean active line width after the first bin; and
in response to the mean active line width of the width lines in the second bin being less than the threshold value, removing the width lines in the second bin from the binary mask.

13. The binary mask generation circuit of claim 12, wherein the mask build circuit is further configured to:
determine an active line size for each of the plurality of width lines;
remove the width lines in which the active line size is less than a threshold value from the binary mask.

14. The binary mask generation circuit of claim 13, wherein:
the binary mask includes a bit position corresponding to each pixel in the pixel array;
each position is represented by a single bit in which a 1 indicates a point of interest is located at the bit position and a 0 indicates a point of interest is not located at the bit position.

15. A method for providing sparse optical flow support in an optical flow system, comprising:
receiving a plurality of points of interest from a captured image containing an array of pixels arranged as rows and columns and including width lines that correspond to the rows and height lines that correspond to the columns;
generating a binary mask based on the plurality of points of interest, the binary mask including a representation of a subset of the plurality of points of interest; and
generating an optical flow map of the subset of the plurality of points of interest.

16. The method of claim 15, wherein the generating the binary mask includes:
determining an active line width along each of the width lines to generate a plurality of active line widths;
generating a plurality of bins based on the active line width of each width line;
determining a number of width lines in each bin; and
removing a first bin of the plurality of bins from the binary mask.

17. The method of claim 16, wherein the determining the active line width includes determining a line length between a first point of the plurality of points of interest on the first width line and a last point of the of the plurality of points of interest on the first width line, the first point corresponding with a leftmost pixel containing the point of interest on the first width line and the last point corresponding with a rightmost pixel containing the point of interest on the first width line.

18. The method of claim 16, wherein the generating the binary mask further includes:
comparing a number of the width lines in the first bin to a threshold value, the first bin containing a longest mean active line width of the plurality of bins; and
in response to the number of width lines in the first bin being less than the threshold value, removing the width lines in the first bin from the binary mask.

19. The method of claim 18, wherein the generating the binary mask further includes:
comparing a number of width lines in a second bin to the threshold value, the second bin containing a next longest mean active line width after the first bin; and
in response to the number of width lines in the second bin being less than the threshold value, removing the width lines in the second bin from the binary mask.

20. The method of claim 15, wherein the generating the binary mask includes:
determining an active line size for each of the plurality of width lines to generate a plurality of active line sizes;
comparing each of the active line sizes to a threshold value;
in response to a determination that a first of the active line sizes is less than the threshold value, removing the width line corresponding to the first of the active line sizes from the binary mask.

* * * * *